(12) United States Patent
Nagase

(10) Patent No.: US 11,966,746 B2
(45) Date of Patent: Apr. 23, 2024

(54) INFORMATION PROCESSING APPARATUS AND NON-TRANSITORY COMPUTER READABLE MEDIUM STORING INFORMATION PROCESSING PROGRAM FOR RECOVERING ERROR

(71) Applicant: FUJIFILM Business Innovation Corp., Tokyo (JP)

(72) Inventor: Sho Nagase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 366 days.

(21) Appl. No.: 17/386,573

(22) Filed: Jul. 28, 2021

(65) Prior Publication Data

US 2022/0300292 A1 Sep. 22, 2022

(30) Foreign Application Priority Data

Mar. 16, 2021 (JP) ................................ 2021-042381

(51) Int. Cl.
*G06F 9/4401* (2018.01)
*G06F 11/07* (2006.01)
*G06F 11/14* (2006.01)
*G06F 11/32* (2006.01)

(52) U.S. Cl.
CPC ........ *G06F 9/4401* (2013.01); *G06F 11/0772* (2013.01); *G06F 11/0787* (2013.01); *G06F 11/1438* (2013.01); *G06F 11/327* (2013.01); *G06F 2201/865* (2013.01)

(58) Field of Classification Search
CPC .... G06F 9/4401; G06F 9/4405; G06F 9/4403; G06F 9/4406; G06F 9/4408; G06F 9/445; G06F 9/44505; G06F 9/4451; G06F 11/11433; G06F 11/1435; G06F 11/1443; G06F 2201/865; G06F 2201/875
See application file for complete search history.

(56) References Cited

U.S. PATENT DOCUMENTS

| 10,509,568 B2 | 12/2019 | Hashimoto et al. |
| 11,392,700 B1* | 7/2022 | Beard .................... G06F 21/565 |
| 2005/0268296 A1* | 12/2005 | Marolia .................... G06F 8/65 |
| | | 717/168 |

(Continued)

FOREIGN PATENT DOCUMENTS

| JP | 2003263323 | 9/2003 |
| JP | 2017156945 | 9/2017 |
| JP | 2019020872 | 2/2019 |

*Primary Examiner* — Raymond N Phan
(74) *Attorney, Agent, or Firm* — JCIPRNET

(57) ABSTRACT

An information processing apparatus includes a processor configured to perform processing of acquiring firmware that includes three or more binaries including a first program, a second program, and a third program and in which a download program is provided in the first program and the programs are started up in order from the first program, verifying the subsequent program by starting up the programs in order from the first program, verifying the subsequent program by the program in which the download program is not provided, and recording an error flag in a non-volatile memory area in a case where an error occurs, and recovering the error by executing the download program in a case where the error flag is recorded in the non-volatile memory area at a time of restart.

20 Claims, 6 Drawing Sheets

(56) References Cited

U.S. PATENT DOCUMENTS

2010/0162352 A1* 6/2010 Haga .................. G06F 21/51
    726/2
2020/0134164 A1* 4/2020 Berthelot ............. G06F 21/52
2020/0151361 A1   5/2020 Shidai et al.
2022/0300292 A1* 9/2022 Nagase ............ G06F 11/0772

* cited by examiner

INFORMATION PROCESSING APPARATUS AND NON-TRANSITORY COMPUTER READABLE MEDIUM STORING INFORMATION PROCESSING PROGRAM FOR RECOVERING ERROR

CROSS-REFERENCE TO RELATED APPLICATIONS

This application is based on and claims priority under 35 USC 119 from Japanese Patent Application No. 2021-042381 filed Mar. 16, 2021.

BACKGROUND

(i) Technical Field

The present invention relates to an information processing apparatus and a non-transitory computer readable medium storing an information processing program.

(ii) Related Art

JP2003-263323A proposes a download apparatus and a download method of greatly reducing an increase in program volume while making various communication means that can be used by a control program available even in a case where the control program is downloaded. Specifically, a startup program, a main program, and a control program are stored in a ROM, the startup program including a download program for performing downloading by using only a communication driver that performs communication by communication means that can be controlled by simple processing, and the control program including a communication program for performing communication by communication means that requires at least complicated processing and a self-rewriting program that can be downloaded by using the communication program. In a case where the control program is valid, the self-rewriting program enables downloading using high-performance communication means. At this time, OS and the like are not redundantly maintained, and thus the program volume can be reduced.

JP2019-020872A proposes an electronic control apparatus that performs processing of detecting tampering of a program for each divided program obtained by dividing the program as a tampering verification target. The electronic control apparatus reduces a storage area used for storing a verification authenticator while satisfying a limitation of a startup time. Specifically, there is proposed an electronic control apparatus including a storage unit that stores a plurality of divided programs obtained by dividing a program and a verification authenticator, a cryptographic computation unit that generates partial authenticators for each of the plurality of divided programs by cryptographic computation, and a verification unit that generates an arithmetic authenticator by performing logical computation using a plurality of the partial authenticators and verifies whether or not the program is tampered depending on whether or not the verification authenticator and the arithmetic authenticator match with each other.

JP2017-156945A proposes an information processing apparatus capable of starting up a program appropriately and at high speed. Specifically, there is proposed an information processing apparatus that can perform secure boot and includes a non-volatile memory, a permission unit, a determination unit, and a verification unit. The non-volatile memory includes a first non-volatile memory area in which a program is stored, and a second non-volatile memory area in which a first flag having a first value indicating that the program is not verified or a second value indicating that the program is verified is stored. The permission unit includes a storage device that stores a second flag having a third value indicating that rewriting to the first non-volatile memory area is prohibited or a fourth value indicating that rewriting to the first non-volatile memory area is permitted, changes a value of the first flag to the first value in a case where a rewriting permission request is received and the first flag has the second value, and changes a value of the second flag to the fourth value according to the change of the first flag. The determination unit determines that verification of the program is necessary in a case where the first flag has the first value at a time of start-up of the information processing apparatus, and determines that verification of the program is unnecessary in a case where the first flag has the second value at a time of start-up of the information processing apparatus. The verification unit controls the permission unit such that the value of the second flag is changed to the third value in a case where a verification request is received or in a case where verification of the program is necessary, performs verification of the program according to the change of the second flag, and skips verification of the program in a case where verification of the program is unnecessary.

SUMMARY

In firmware including three or more binaries, in a case where a download program is provided in all the binaries, the download program is redundant. On the other hand, in a case where there is a binary in which a download program is not provided and a subsequent program is verified by the binary in which a download program is not provided, an error may occur, and recovery may not be possible.

Aspects of non-limiting embodiments of the present disclosure relate to an information processing apparatus and a non-transitory computer readable medium storing an information processing program that perform recovery even in a case where an error occurs without providing a download program in some binaries of firmware including three or more binaries.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform processing of acquiring firmware that includes three or more binaries including a first program, a second program, and a third program and in which a download program is provided in the first program and the programs are started up in order from the first program, verifying the subsequent program by starting up the programs in order from the first program, verifying the subsequent program by the program in which the download program is not provided, and recording an error flag in a non-volatile memory area in a case where an error occurs, and recovering the error by executing the download program in a case where the error flag is recorded in the non-volatile memory area at a time of restart.

BRIEF DESCRIPTION OF THE DRAWINGS

Exemplary embodiment(s) of the present invention will be described in detail based on the following figures, wherein.

DETAILED DESCRIPTION

Figure 1:
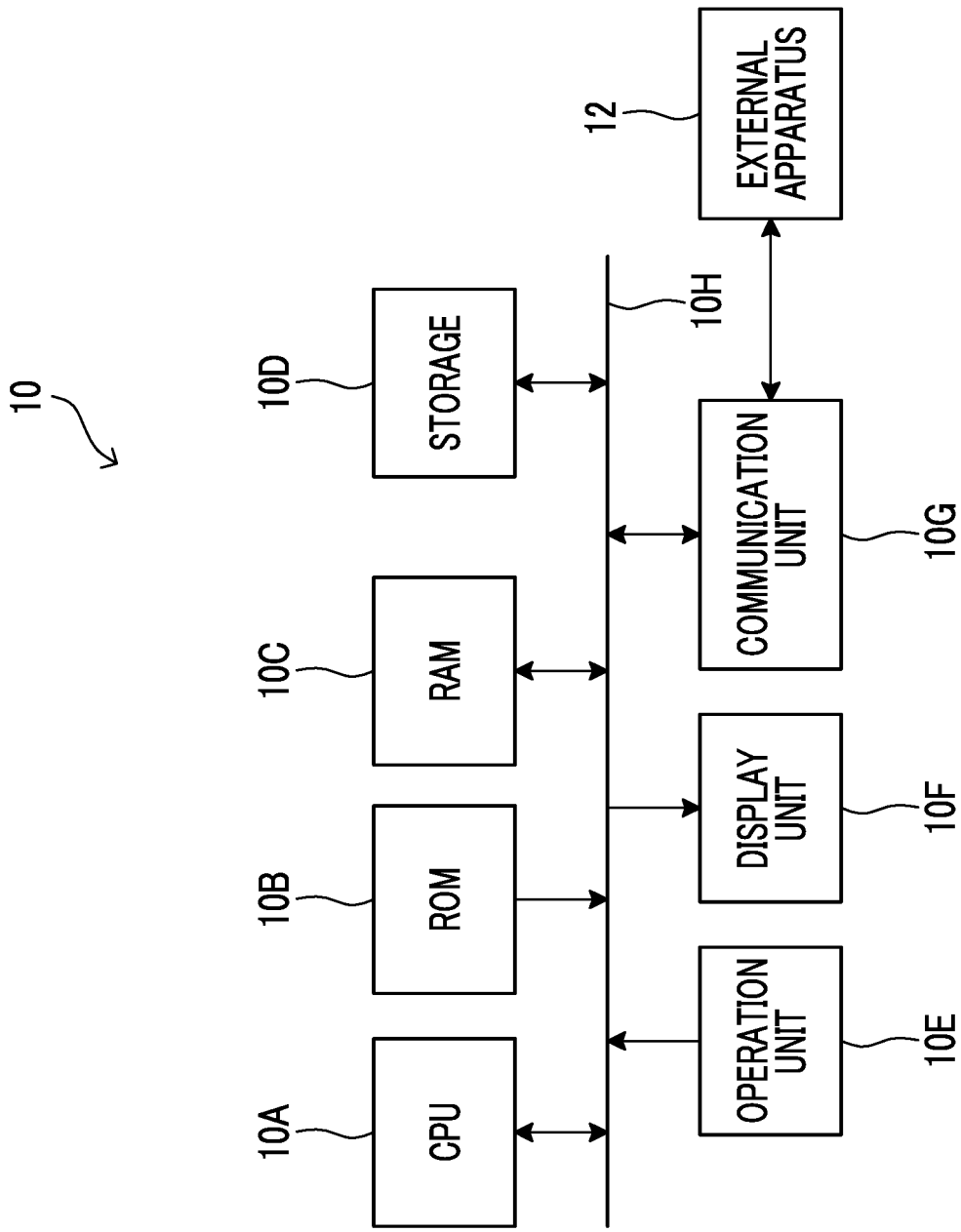
FIG. 1 is a diagram illustrating a schematic configuration of an information processing apparatus according to the present exemplary embodiment.

Hereinafter, an exemplary embodiment of the present invention will be described in detail with reference to the drawings. In the present exemplary embodiment, an information processing apparatus included in an image forming apparatus will be described as an example. FIG. 1 is a diagram illustrating a schematic configuration of an information processing apparatus according to the present exemplary embodiment. As an image forming apparatus including the information processing apparatus 10, for example, an image forming apparatus having a plurality of functions such as a facsimile function, an image reading function, an image forming function, a copying function, a storage function for storing image information, and a transmission function for transmitting image information may be used.

The information processing apparatus 10 includes a central processing unit (CPU) 10A as an example of a processor, a read only memory (ROM) 10B, a random access memory (RAM) 10C, a storage 10D, an operation unit 10E, a display unit 10F, and a communication unit 10G. The CPU 10A controls overall operations of the information processing apparatus 10. In the ROM 10B, various control programs, various parameters, and the like are stored in advance. The RAM 10C is used as a work area in a case where the CPU 10A executes various programs. In the storage 10D, various data, various programs, and the like are stored. The operation unit 10E is used to input various information. The display unit 10F is used to display various information. The communication unit 10G can be connected to an external apparatus 12, and transmits/receives various data to/from the external apparatus 12. The units of the information processing apparatus 10 are electrically connected to each other via a system bus 10H.

With the configuration, the information processing apparatus 10 according to the present exemplary embodiment causes the CPU 10A to access the ROM 10B, the RAM 10C, and the storage 10D, acquire various data via the operation unit 10E, and display various information on the display unit 10F. Further, the information processing apparatus 10 causes the CPU 10A to execute a control of transmission/reception of various data via the communication unit 10G.

In addition, the information processing apparatus 10 according to the present exemplary embodiment includes various configurations for image formation. For example, the information processing apparatus 10 includes configurations for performing image processing and image formation. In the present exemplary embodiment, the information processing apparatus 10 included in the image forming apparatus will be described. On the other hand, the present invention is not limited thereto, and the information processing apparatus 10 included in another apparatus may be used. For example, the information processing apparatus 10 included in an image reading apparatus may be used. In this case, in addition to the configuration illustrated in FIG. 1, the information processing apparatus 10 includes configurations for image reading and image processing.

On the other hand, in the information processing apparatus 10 according to the present exemplary embodiment, firmware is stored in the ROM 10B or the storage 10D, and the firmware may be updated. In the information processing apparatus 10 according to the present exemplary embodiment, as the ROM 10B or the storage 10D, a rewritable non-volatile memory such as an electrically erasable programmable read-only memory (EEPROM) or a flash memory may be used. Hereinafter, it is assumed that the firmware is stored in the ROM 10B.

In the ROM 10B of the information processing apparatus 10 according to the present exemplary embodiment, a program to be executed by the CPU 10A, data used in a case where the program is executed, and the like are stored. In particular, here, updatable firmware is stored in the ROM 10B. In the present exemplary embodiment, the firmware includes three binaries of boot, kernel, and application. In the following, boot is referred to as a startup program, kernel is referred to as a core program, and application is referred to as an application program. Each firmware program may be stored in the same ROM 10B, or may be stored in another ROM, the storage 10D, or the like. At least the core program and the application program are stored in a rewritable area or a storage unit such as a flash memory. Further, in the following, two programs of the core program and the application program may be collectively referred to as a control program.

The RAM 10C is used as a work area in a case where the CPU 10A operates. Further, the RAM 10C may temporarily store received data including a new control program in a case where firmware is downloaded.

The CPU 10A operates according to a program such as firmware in the ROM 10B, controls the entire information processing apparatus 10, and provides various functions. In addition, the CPU 10A downloads transmission data including a new control program from the external apparatus 12, and performs processing of rewriting the control program.

Figure 2:
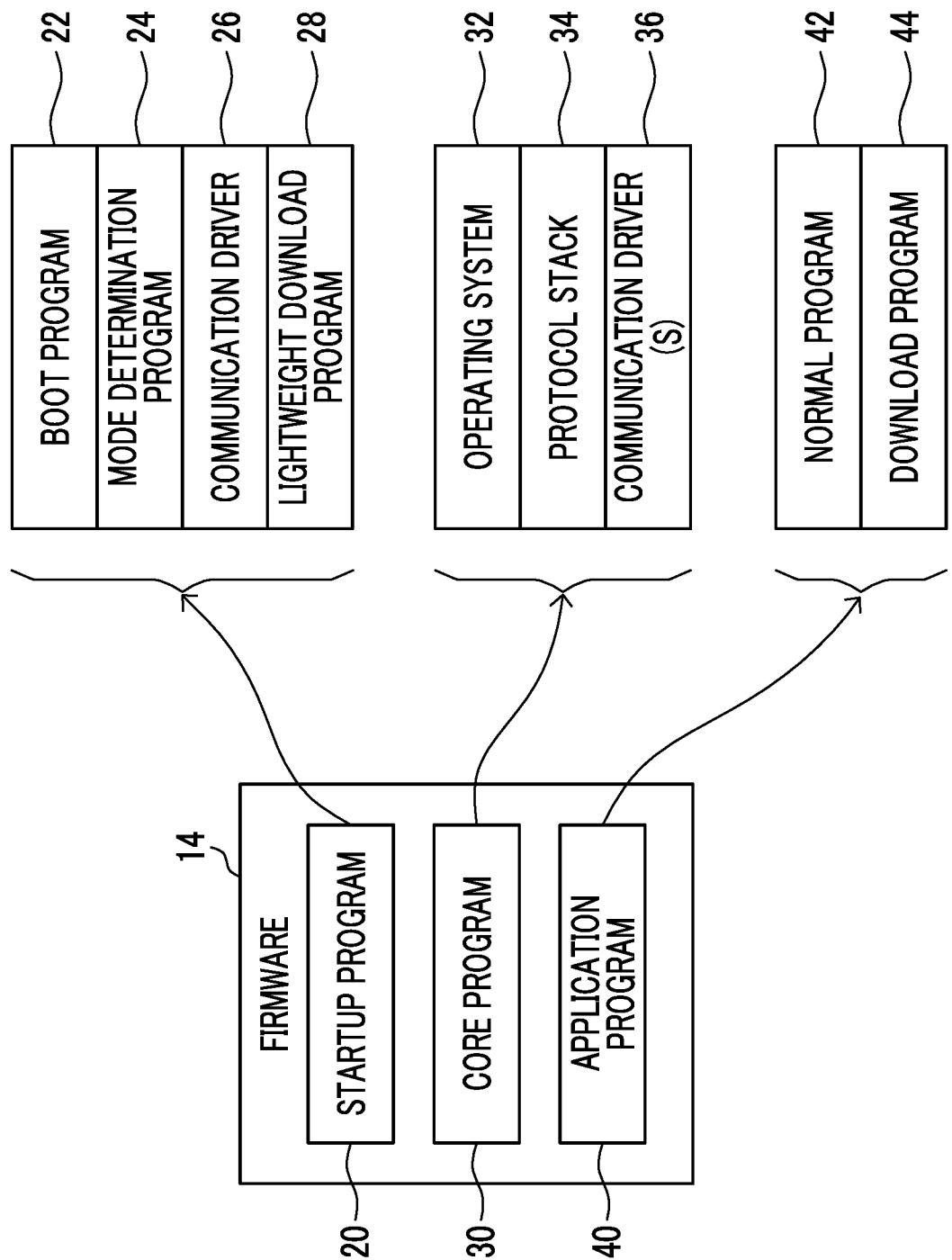
FIG. 2 is a block diagram illustrating a configuration example of firmware stored in a ROM of the information processing apparatus according to the present exemplary embodiment.

Here, a configuration example of the firmware of the information processing apparatus 10 according to the present exemplary embodiment will be briefly described. FIG. 2 is a block diagram illustrating a configuration example of the firmware 14 stored in the ROM 10B of the information processing apparatus 10 according to the present exemplary embodiment.

As illustrated in FIG. 2, the firmware 14 includes three binaries of a startup program 20 as an example of a first program, a core program 30 as an example of a second program, and an application program 40 as an example of a third program.

The startup program 20 includes a boot program 22, a mode determination program 24, a communication driver 26, and a lightweight download program 28. The boot program 22 is a program that operates when the information processing apparatus is started up such as when power is turned on or when reset is performed. The mode determination program 24 is a program for determining a mode after the information processing apparatus 10 is started up by the boot program. For example, in the present exemplary embodiment, one of a normal mode, a download mode, and a lightweight download mode is determined. The mode is selected by a predetermined special operation, for example, an operation of starting up the information processing apparatus while pressing a predetermined key of the operation unit 10E in a case where power is turned on. The lightweight download mode is, for example, a mode for developers, and the download mode is a mode for users. The communication driver is, for example, a minimum communication driver, and performs communication by simple processing via the communication unit 10G. Here, the simple processing does not require an operating system 32 and a protocol stack 34. The startup program 20 does not include the operating system 32 and the protocol stack 34, and may have a minimum configuration as necessary. The lightweight download program 28 is a lightweight program that is simpler than a download program 44 of the application program 40 to be described, and is a program for performing downloading and rewriting via the communication driver 26.

The core program 30 includes an operating system 32, a protocol stack 34, and a plurality of communication drivers 36, and is a core part of the firmware 14. The operating system 32 controls operations of the image forming apparatus including the information processing apparatus 10. The protocol stack defines a hierarchy of a protocol. The plurality of communication drivers 36 perform high-performance communication via the communication unit 10G by performing processing that is more complicated than processing of the communication driver 26 of the startup program 20.

The application program 40 includes a normal program 42 and a download program 44. The normal program 42 is a program used for each function of the image forming apparatus, and the download program 44 is a program for performing downloading and rewriting.

Figure 3:
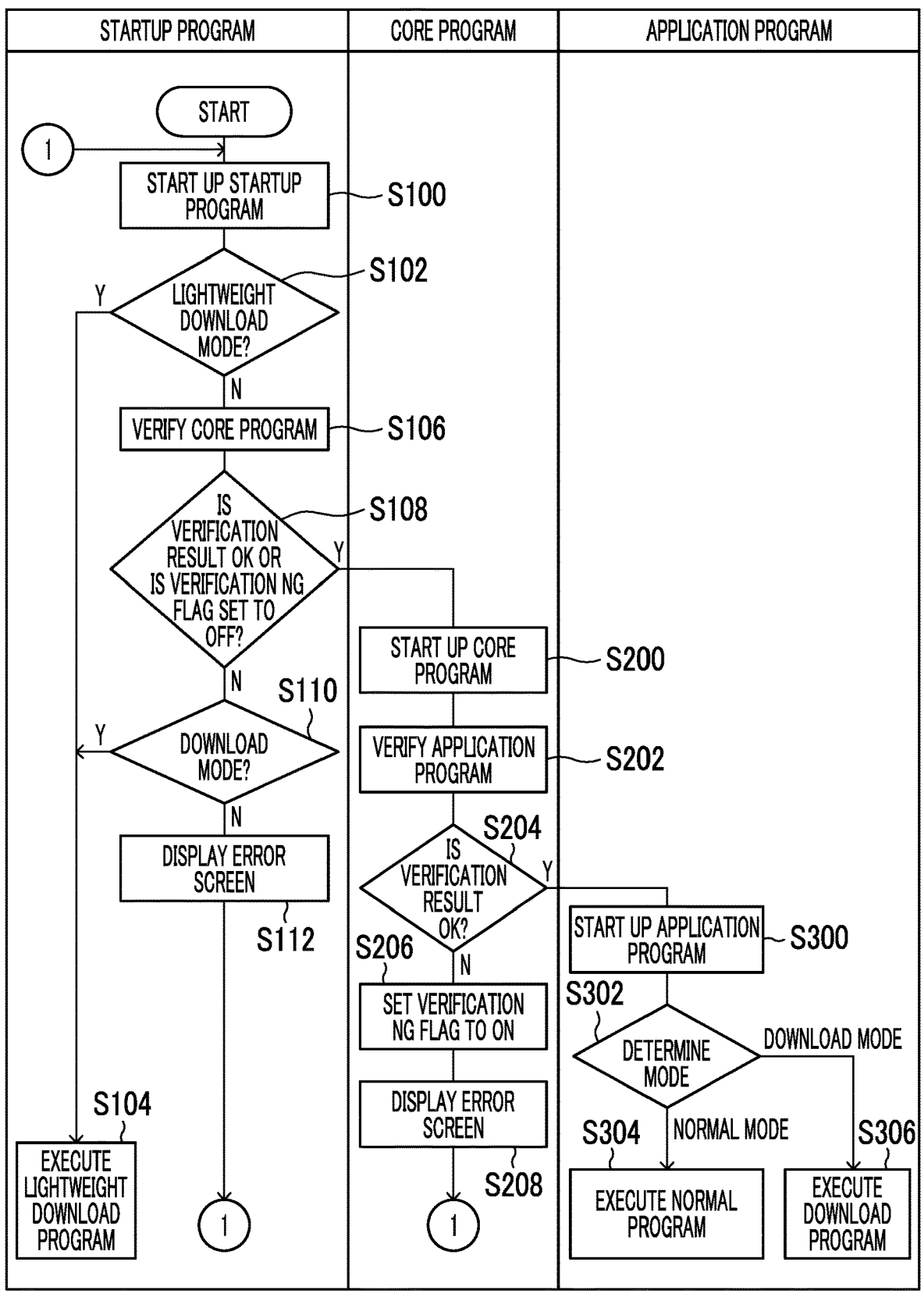
FIG. 3 is a flowchart illustrating an example of a flow of processing performed by the information processing apparatus according to the present exemplary embodiment.

Next, processing performed by the information processing apparatus 10 according to the present exemplary embodiment will be described. FIG. 3 is a flowchart illustrating an example of a flow of processing performed by the information processing apparatus 10 according to the present exemplary embodiment. The processing of FIG. 3 is started in a case where power is turned on by, for example, a power button (not illustrated).

In step S100, the startup program 20 is started up by the CPU 10A, and the process proceeds to step S102.

In step S102, the CPU 10A determines whether or not the lightweight download mode is selected. In the determination, the CPU 10A determines whether or not the lightweight download mode is selected by a predetermined special operation such as an operation of starting up the information processing apparatus while pressing a predetermined key of the operation unit 10E. In a case where a determination result in step S102 is YES, the process proceeds to step S104, and in a case where a determination result in step S102 is NO, the process proceeds to step S106.

In step S104, the CPU 10A executes the lightweight download program 28. In step S104, in a state where downloading by the lightweight download program 28 is executed after restart, in a case where a verification NG flag that is set to ON is recorded in a non-volatile memory area, the CPU 10A may delete the verification NG flag by setting the verification NG flag to OFF.

In step S106, the CPU 10A verifies the core program 30, and the process proceeds to step S108. For example, the CPU 10A verifies whether or not the core program 30 is tampered by using a checksum or the like.

In step S108, the CPU 10A determines whether or not a verification result is OK or whether or not the verification NG flag is set to OFF. In the determination, the CPU 10A determines whether or not a verification result in step S106 is OK, or whether or not the verification NG flag to be described is set to OFF. In a case where a determination result in step S108 is NO, the process proceeds to step S110, and in a case where a determination result in step S108 is YES, the process proceeds to step S200.

In step S110, the CPU 10A determines whether or not the download mode is selected. In the determination, the CPU 10A determines whether or not the download mode is selected by a predetermined special operation. In a case where a determination result in step S110 is YES, the process proceeds to step S104, and the CPU 10A executes the lightweight download program 28. Thereby, the program with the verification NG flag is recovered.

In a case where a determination result in step S110 is NO, the process proceeds to step S112, and an error screen is displayed on the display unit 10F. Here, in a case where restart is instructed or in a case where a predetermined time is elapsed, the information processing apparatus 10 is restarted. Thereafter, the process returns to step S100, and the above processing is repeated.

On the other hand, in step S200, the CPU 10A starts up the core program 30, and the process proceeds to step S202.

In step S202, the CPU 10A verifies the application program 40, and the process proceeds to step S204. For example, the CPU 10A verifies whether or not the application program 40 is tampered by using a checksum or the like.

In step S204, the CPU 10A determines whether or not a verification result is OK. In the determination, the CPU 10A determines whether or not a verification result in step S202 is OK. In a case where a determination result in step S204 is NO, the process proceeds to step S206, and in a case where a determination result in step S204 is YES, the process proceeds to step S300. In a state where it is determined that a verification result in step S204 is OK, in a case where the verification NG flag that is set to ON is recorded in the non-volatile memory area, the CPU 10A may delete the verification NG flag by setting the verification NG flag to OFF. It is noted that the verification NG flag is deleted in a case where any of the two conditions is satisfied. That is, in a case where downloading by the lightweight download program 28 is executed after restart, or in a case where the program corresponding to the verification NG flag is verified after restart and no error occurs, the verification NG flag is deleted.

In step S206, the CPU 10A sets the verification NG flag to ON, and records the verification NG flag in a non-volatile memory area such as EEPROM or a flash memory, the verification NG flag being an error flag indicating that the application program may be tampered. Then, the process proceeds to step S208.

In step S208, the CPU 10A displays an error screen on the display unit 10F. For example, the CPU 10A displays, on the display unit 10F, a fact that an error occurs and recovery is possible by restart. Here, in a case where restart is instructed or in a case where a predetermined time is elapsed, the information processing apparatus 10 is restarted. Thereafter, the process returns to step S100, and the above processing is repeated.

On the other hand, in step S300, the CPU 10A starts up the application program 40, and the process proceeds to step S302.

In step S302, the CPU 10A determines a mode. For example, in a case where the normal mode is selected by a predetermined special operation, the process proceeds to step S304, and in a case where the download mode is selected by a predetermined special operation, the process proceeds to step S306.

In step S304, the CPU 10A executes the normal program 42. On the other hand, in step S306, the CPU 10A executes the download program 44. By executing the download program 44, even in a case where an error occurs, a program with an error is recovered.

Figure 4:
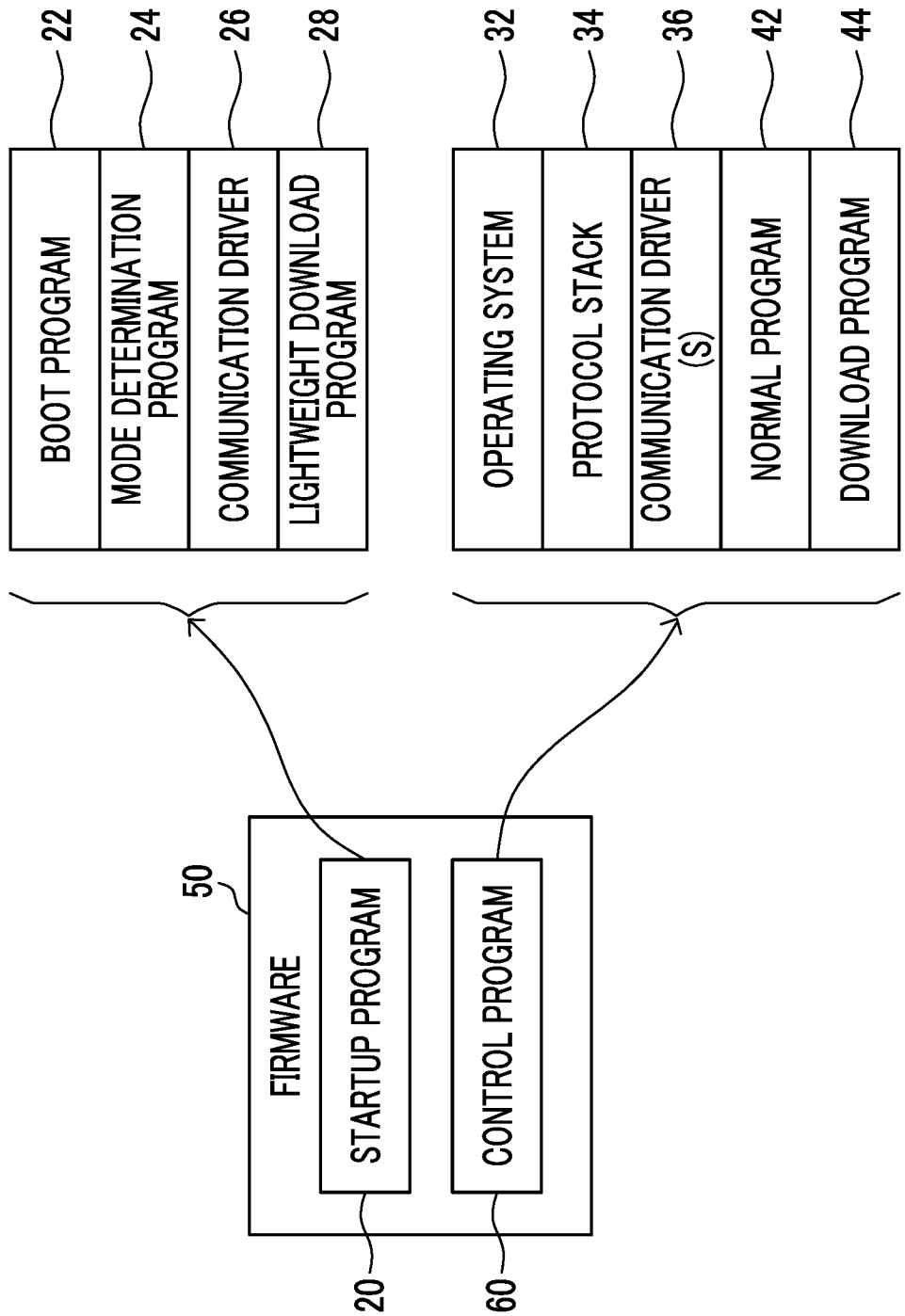
FIG. 4 is a block diagram illustrating a configuration example of firmware in the related art.

Here, as a comparative example, firmware in the related art will be briefly described. FIG. 4 is a block diagram illustrating a configuration example of firmware in the related art. In FIG. 4, components corresponding to the components of the firmware 14 according to the present exemplary embodiment are denoted by the same reference numerals, and detailed description thereof will be omitted.

As described in JP2003-263323A, firmware 50 in the related art includes two binaries of a startup program 20 and a control program 60.

The startup program 20 cannot be changed after being written at a time of production, and includes a boot program 22, a mode determination program 24, a communication driver 26, and a lightweight download program 28.

On the other hand, the control program 60 has a configuration in which the core program 30 and the application program 40 of the firmware 14 according to the present exemplary embodiment are combined. That is, the control program 60 includes the operating system 32, the protocol stack 34, the communication driver 36, the normal program 42, and the download program 44.

The startup program 20 verifies whether or not the control program 60 is tampered by using a checksum or the like. The startup program 20 starts up the control program 60 in a case where it is determined that the control program 60 is not tampered, and stops startup of the control program 60 in a case where it is determined that the control program 60 is tampered.

The firmware 50 in the related art also has a normal mode, a download mode, and a lightweight download mode. In the lightweight download mode, the startup program 20 executes the lightweight download program 28 in the startup program 20 without starting up the control program 60. In the normal mode and the download mode, the startup program 20 verifies the control program 60, and then starts up the control program 60 by using, as a parameter, the mode. The startup program 20 has a recovery function. For example, in a case where the control program 60 is started up in the download mode and a verification result of the control program 60 is fail, the startup program 20 changes the download mode to the lightweight download mode and recovers the control program 60.

In a case where the two-binary configuration as in the firmware 50 in the related art is changed to the three-binary configuration as in the firmware 14 according to the present exemplary embodiment, as in the firmware 50 in the related art, in a case where the download program is provided in all the programs of the firmware 50, the download program is redundant.

On the other hand, in a case where the download program is not provided in some of the programs, it is not possible to start up the program that is not provided, verify the subsequent program, and recover the program in a case where an error occurs. For example, as in the present exemplary embodiment, in a case where the download program is not provided in the core program 30, as illustrated in the flowchart illustrated in FIG. 5, it is not possible to recover the core program during an execution of the core program.

Figure 5:
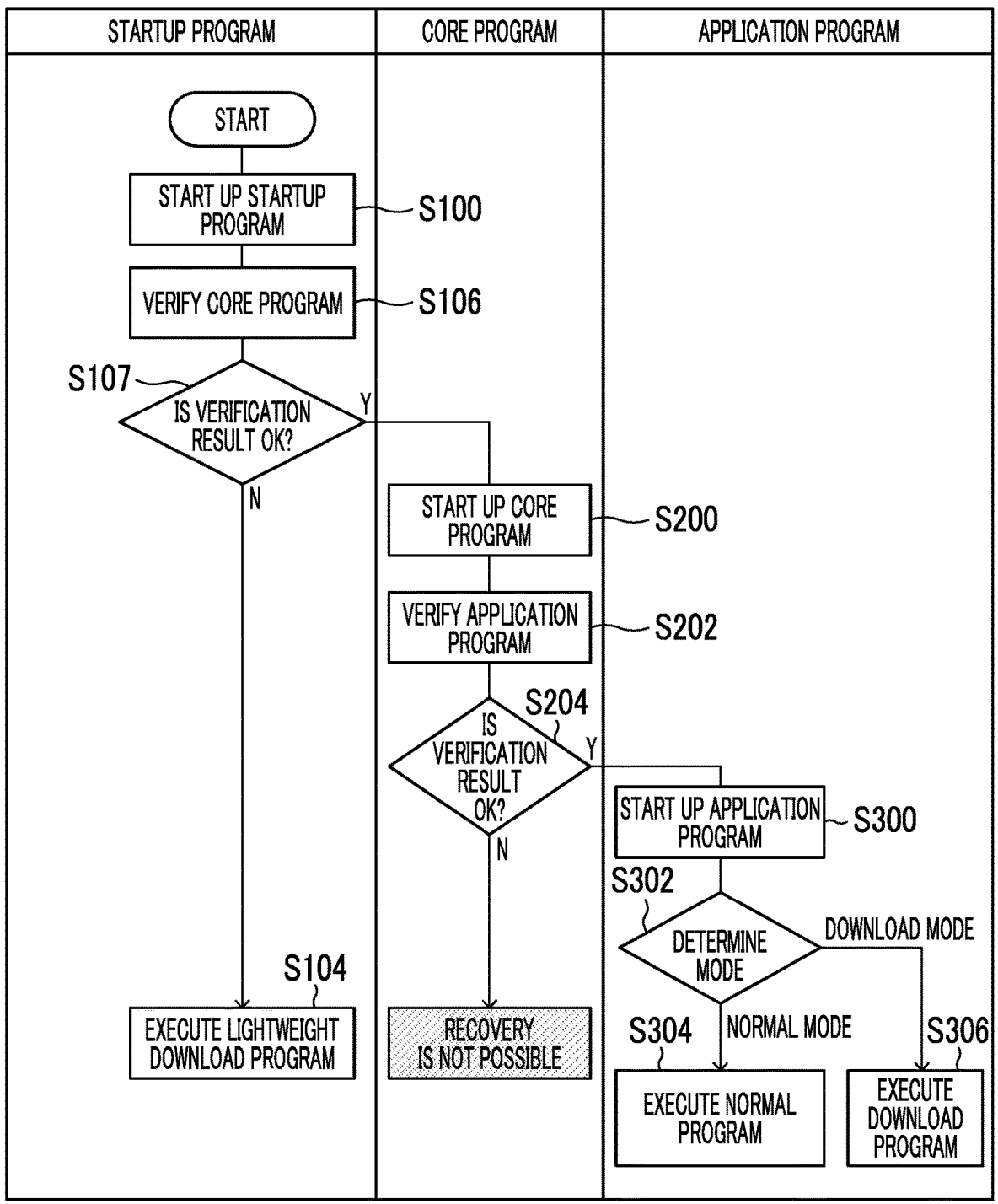
FIG. 5 is a flowchart illustrating a flow of processing in a case where a download program is not provided in a core program and recovery is not possible.

Here, a flow of processing in a case where the firmware 14 includes three binaries and the download program is not provided in the core program 30 will be described. FIG. 5 is a flowchart illustrating a flow of processing in a case where the download program is not provided in the core program 30 and recovery is not possible. The processing common to the processing of FIG. 3 will be described with the same reference numerals.

In step S100, the startup program 20 is started up by the CPU 10A, and the process proceeds to step S106.

In step S106, the CPU 10A verifies the core program 30, and the process proceeds to step S107. For example, the CPU 10A verifies whether or not the core program 30 is tampered by using a checksum or the like.

In step S107, the CPU 10A determines whether or not a verification result is OK. In the determination, the CPU 10A determines whether or not a verification result in step S106 is OK. In a case where a determination result in step S107 is NO, the process proceeds to step S104, and the CPU 10A executes the lightweight download program 28. In a case where a determination result in step S107 is YES, the process proceeds to step S200.

In step S200, the CPU 10A starts up the core program 30, and the process proceeds to step S202.

In step S202, the CPU 10A verifies the application program 40, and the process proceeds to step S204. For example, the CPU 10A verifies whether or not the application program 40 is tampered by using a checksum or the like.

In step S204, the CPU 10A determines whether or not a verification result is OK. In the determination, the CPU 10A determines whether or not a verification result in step S202 is OK. Here, in a case where a determination result in step S204 is YES, the process proceeds to step S300. The processes of step S300 and subsequent steps are performed in the same manner as in the exemplary embodiment, and thus a description thereof will be omitted. On the other hand, in a case where a determination result in step S204 is NO, the download program cannot be executed, and thus recovery is not possible.

On the other hand, in the present exemplary embodiment, as described above, the download program is not provided in the core program 30, and the CPU 10A verifies the application program 40 to be executed next. In a case where a verification result is NG, the CPU 10A sets the verification NG flag to ON, and stores the verification NG flag in the non-volatile memory area. Thereby, at a time of restart, the CPU 10A checks the verification NG flag. In a case where the verification NG flag is set to ON, the program in which an error occurs is downloaded and is recovered by the lightweight download program 28 provided in the startup program 20.

Further, it is also considered to verify all the programs when the startup program 20 is executed. On the other hand, in the startup program, lightness of processing affects a startup speed. For this reason, a method of verifying all the programs at a time of startup is not preferable. Therefore, for example, a method of verifying only the programs to be executed is preferable because a minimum processing time is required. For example, after the startup program 20 verifies the core program 30 and the application program 40, in a case where processing cannot be continued by insufficient memory due to a failure or the like during processing of the core program 30, verification of the application program becomes useless, and it takes a long time to display an error screen. For this reason, it is not preferable to verify all the programs.

Figure 6:
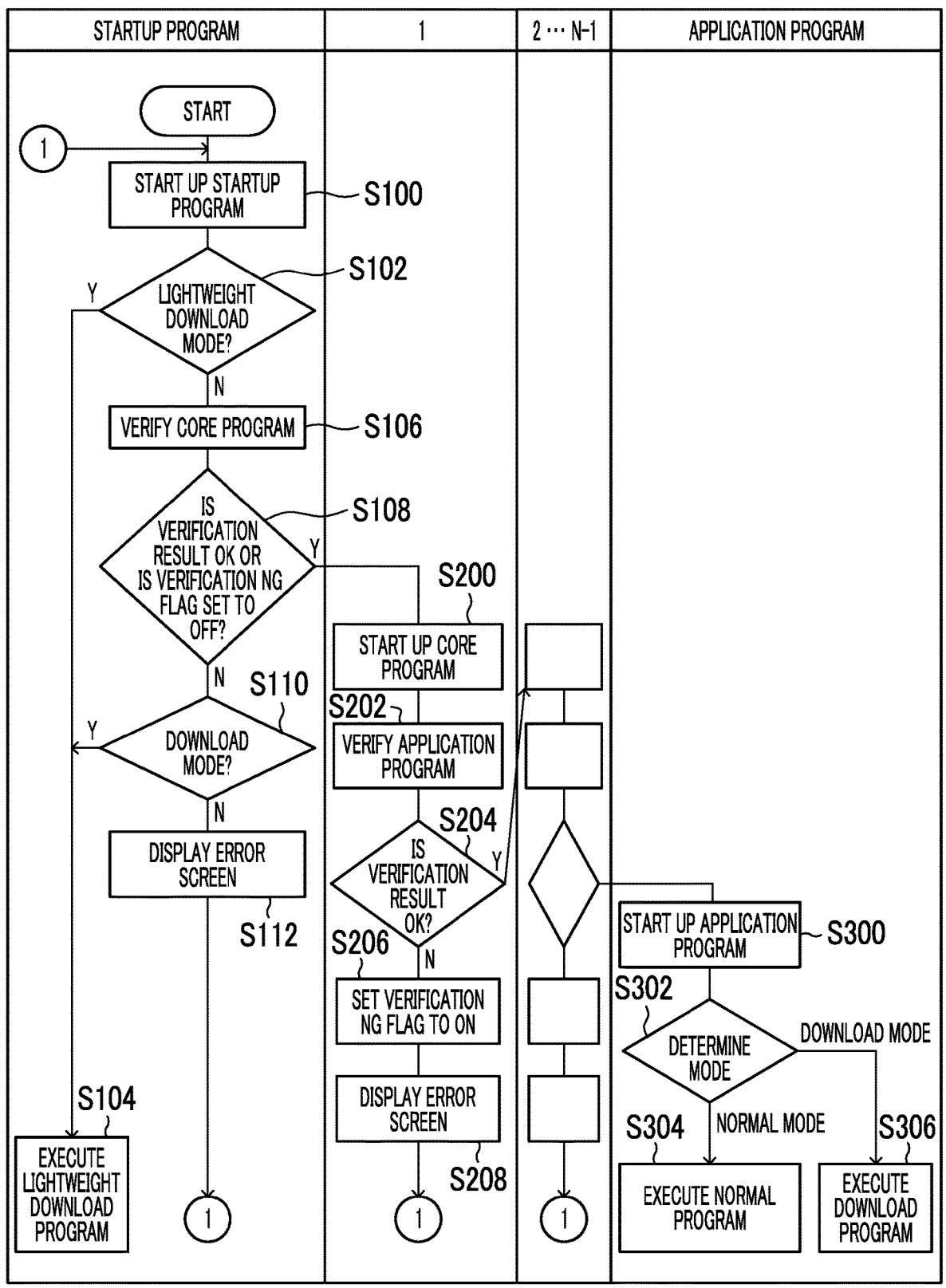
FIG. 6 is a flowchart illustrating an example of a flow of processing in a case where the firmware includes a startup program, (N-1) programs, and an application program.

In the present exemplary embodiment, an example in which the firmware 14 includes three binaries has been described. On the other hand, the firmware 14 is not limited to the configuration including three binaries, and may include four or more binaries. FIG. 6 is a flowchart illustrating an example of a flow of processing in a case where the firmware includes a startup program 20, (N-1) programs, and an application program 40. The processing common to the processing of FIG. 3 will be described with the same reference numerals. In the example of FIG. 6, a lightweight download program is provided in the startup program 20, a download program is provided in the application program 40, and a download program is not provided in the (N-1) programs. In FIG. 6, the startup program 20 and the application program 40 perform the same processing as the processing in FIG. 3, and the (N-1) programs perform the same processing as the processing of the core program 30 in FIG. 3. That is, in a case where the subsequent program is verified and a verification result is NG, the verification NG flag is set to ON and is recorded in the non-volatile memory area, and an error screen is displayed. Thereby, at a time of restart, the program with an error is recovered by executing the lightweight download program of the startup program 20.

In the example of FIG. 6, an example in which the lightweight download program 28 and the download program 44 are not provided in all of the (N-1) programs has been described. On the other hand, the present disclosure is not limited thereto. For example, the lightweight download program 28 or the download program 44 may be provided in some programs of the (N-1) programs.

Further, in the exemplary embodiment, an example in which the lightweight download program 28 is provided in the startup program 20 has been described. On the other hand, a download program, which is not a lightweight download program and is similar to the download program 44 of the application program 40, may be provided in the startup program 20.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the firmware 14 according to the exemplary embodiment may be distributed by being stored in a storage medium.

Further, the present invention is not limited to the exemplary embodiment, and it goes without saying that various modifications may be made without departing from the spirit of the inventions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to perform processing of:
acquiring firmware that includes three or more binaries including a first program, a second program, and a third program and in which a download program is provided in the first program and the first program, the second program and the third program are started up in order from the first program;
verifying a subsequent program by starting up the first program, the second program and the third program in order from the first program, verifying the subsequent program by a program in which the download program is not provided, and recording an error flag in a non-volatile memory area in a case where an error occurs; and
recovering the error by executing the download program in a case where the error flag is recorded in the non-volatile memory area at a time of restart.

2. The information processing apparatus according to claim 1,
wherein the download program is provided in the first program and the program that is started up last.

3. The information processing apparatus according to claim 1,
wherein the firmware includes three binaries including the first program, the second program, and the third program, and
the first program is a startup program in which the download program is provided, the second program is a core program as a core part of an operating system, and the third program is an application program that operates on the operating system.

4. The information processing apparatus according to claim 1, wherein the processor is configured to:
delete the error flag that is recorded in the non-volatile memory area in a case where downloading by the download program is executed after restart or in a case where the program corresponding to the error flag is verified after restart and an error does not occur.

5. The information processing apparatus according to claim 1, wherein the processor is configured to:
further perform processing of displaying, in a case where the error occurs, a fact that the error occurs and recovery is possible by restart, on a display unit.

6. The information processing apparatus according to claim 2,
wherein the download program provided in the first program is a program that is simpler than the download program provided in the program that is started up last.

7. The information processing apparatus according to claim 2,
wherein the firmware includes three binaries including the first program, the second program, and the third program, and
the first program is a startup program in which the download program is provided, the second program is a core program as a core part of an operating system, and the third program is an application program that operates on the operating system.

8. The information processing apparatus according to claim 2, wherein the processor is configured to:
delete the error flag that is recorded in the non-volatile memory area in a case where downloading by the download program is executed after restart or in a case where the program corresponding to the error flag is verified after restart and an error does not occur.

9. The information processing apparatus according to claim 2, wherein the processor is configured to:

further perform processing of displaying, in a case where the error occurs, a fact that the error occurs and recovery is possible by restart, on a display unit.

10. The information processing apparatus according to claim 3, wherein the processor is configured to:

delete the error flag that is recorded in the non-volatile memory area in a case where downloading by the download program is executed after restart or in a case where the program corresponding to the error flag is verified after restart and an error does not occur.

11. The information processing apparatus according to claim 3, wherein the processor is configured to:

further perform processing of displaying, in a case where the error occurs, a fact that the error occurs and recovery is possible by restart, on a display unit.

12. The information processing apparatus according to claim 4, wherein the processor is configured to:

further perform processing of displaying, in a case where the error occurs, a fact that the error occurs and recovery is possible by restart, on a display unit.

13. The information processing apparatus according to claim 6, wherein the processor is configured to:

delete the error flag that is recorded in the non-volatile memory area in a case where downloading by the download program is executed after restart or in a case where the program corresponding to the error flag is verified after restart and an error does not occur.

14. The information processing apparatus according to claim 6, wherein the processor is configured to:

further perform processing of displaying, in a case where the error occurs, a fact that the error occurs and recovery is possible by restart, on a display unit.

15. The information processing apparatus according to claim 6, wherein the firmware includes three binaries including the first program, the second program, and the third program, and the first program is a startup program in which the download program is provided, the second program is a core program as a core part of an operating system, and the third program is an application program that operates on the operating system.

16. The information processing apparatus according to claim 7, wherein the processor is configured to:

delete the error flag that is recorded in the non-volatile memory area in a case where downloading by the download program is executed after restart or in a case where the program corresponding to the error flag is verified after restart and an error does not occur.

17. The information processing apparatus according to claim 7, wherein the processor is configured to:

further perform processing of displaying, in a case where the error occurs, a fact that the error occurs and recovery is possible by restart, on a display unit.

18. The information processing apparatus according to claim 15, wherein the processor is configured to:

delete the error flag that is recorded in the non-volatile memory area in a case where downloading by the download program is executed after restart or in a case where the program corresponding to the error flag is verified after restart and an error does not occur.

19. The information processing apparatus according to claim 15, wherein the processor is configured to:

further perform processing of displaying, in a case where the error occurs, a fact that the error occurs and recovery is possible by restart, on a display unit.

20. A non-transitory computer readable medium storing an information processing program causing a computer to perform processing of:

acquiring firmware that includes three or more binaries including a first program, a second program, and a third program and in which a download program is provided in the first program and the first program, the second program and the third program are started up in order from the first program;

verifying a subsequent program by starting up the first program, the second program and the third program in order from the first program, verifying the subsequent program by a program in which the download program is not provided, and recording an error flag in a non-volatile memory area in a case where an error occurs; and recovering the error by executing the download program in a case where the error flag is recorded in the non-volatile memory area at a time of restart.

* * * * *